US007400594B2

(12) United States Patent  
Pereira et al.

(10) Patent No.: US 7,400,594 B2
(45) Date of Patent: Jul. 15, 2008

(54) METHOD AND SYSTEM FOR AUTOMATED DISTRIBUTED PAIRING OF WIRELESS NODES OF A COMMUNICATION NETWORK

(75) Inventors: Luis R. Pereira, Milwaukee, WI (US); Jose A. Gutierrez, Menomonee Falls, WI (US)

(73) Assignee: Eaton Corporation, Cleveland, OH (US)

( * ) Notice: Subject to any disclaimer, the term of this patent is extended or adjusted under 35 U.S.C. 154(b) by 468 days.

(21) Appl. No.: 11/120,799

(22) Filed: May 3, 2005

(65) Prior Publication Data

US 2006/0250980 A1    Nov. 9, 2006

(51) Int. Cl.
*H04B 7/00* (2006.01)
*H04L 29/08* (2006.01)
(52) U.S. Cl. .................... 370/310; 455/414.4; 713/171; 707/104.1
(58) Field of Classification Search ................. 370/310; 455/414.4; 707/104.1; 713/171
See application file for complete search history.

(56) References Cited

U.S. PATENT DOCUMENTS

| 6,750,761 B1 * | 6/2004 | Newman ..................... 340/442 |
| 7,050,793 B1 * | 5/2006 | Kenward et al. .......... 455/414.4 |
| 2002/0154025 A1 | 10/2002 | Ling |
| 2004/0003250 A1 * | 1/2004 | Kindberg et al. ............ 713/171 |
| 2005/0138077 A1 * | 6/2005 | Michael et al. .......... 707/104.1 |

OTHER PUBLICATIONS

Ward, A. et al., "A New Location Technique for the Active Office", IEEE Personal Communications, vol. 4. No. 5, Oct. 1997, 11 pp.
Harter, A. et al., "The Anatomy of a Context-Aware Application", Proceedings of the Fifth Annual ACM/IEEE International Conference on Mobile Computing and Networking, Aug. 1999, pp. 59-68.
Abowd, G. et al., "Panel: Towards a Better Understanding of Context and Context-Awareness", Lecture Notes in Computer Science, pp. 1-4.
Bahl, P. et al., "Radar: An In-Building RF-based User Location and Tracking System", Proc. IEEE INFOCOM, Mar. 2000, 10 pp.
Kindberg, T. et al. "Validating and Securing Spontaneous Associations between Wireless Devices", Hewlett-Packard Company, Sep. 12, 2002, pp. i, 1-6.
Whitehouse, K. et al. "Calibration as Parameter Estimation in Sensor Networks", Proceedings of the First ACM International Workshop on Sensor Networks and Applications, Sep. 2002, pp. 59-67.
Priyantha, N.B. et al., "The Cricket Location-Support System", 6th ACM International Conference on Mobile Computing and Networking, Aug. 2000, 12 pp.
IEEE, Part 15.4: Wireless Medium Access Control (MAC) and Physical Layer (PHY) Specifications for Low-Rate Wireless Personal Area Networks (LR-WPANs), 2003, pp. 1-11.

* cited by examiner

*Primary Examiner*—Joseph Feild
*Assistant Examiner*—Kiet Doan
(74) *Attorney, Agent, or Firm*—Martin J. Moran (57) ABSTRACT

A system for pairing wireless nodes includes a plurality of device nodes, such as lamp nodes, a plurality of sensor nodes, such as light switch nodes, and a context manager node. Each of the device nodes, the sensor nodes and the context manager node includes a first communication channel having radio frequency signals and a diverse second communication channel including wireless non-radio frequency signals. Some of the device nodes and the sensor nodes are adapted to collect context information of a corresponding communication environment and to transfer the collected context information to the context manager node. The context manager node is adapted to employ the collected context information and enable automated distributed pairing of a first node of the device nodes and sensor nodes with another second node of the device nodes and sensor nodes.

8 Claims, 10 Drawing Sheets

METHOD AND SYSTEM FOR AUTOMATED DISTRIBUTED PAIRING OF WIRELESS NODES OF A COMMUNICATION NETWORK

BACKGROUND OF THE INVENTION

1. Field of the Invention

This invention pertains generally to wireless communication and, more particularly, to systems employing wireless communication, such as, for example, a wireless local area network (WLAN) or a low rate-wireless personal area network (LR-WPAN). The invention also relates to methods for configuring pairs of nodes in a wireless communication network.

2. Background Information

Wireless communication networks are an emerging new technology, which allows users to access information and services electronically, regardless of their geographic position.

In contrast to wired networks, mesh-type, low rate-wireless personal area network (LR-WPAN) wireless communication networks are intended to be relatively low power, to be self-configuring, and to not require any communication infrastructure (e.g., wires) other than power sources and wireless access points.

Relatively low power, radio frequency (RF) lighting control systems employ battery powered, RF switch "sensors". Such a sensor sends a signal to a remote power control device, such as relay, in order to turn one or more house lights on and off.

One attractive feature in wireless sensor networks is the potential of having relatively lower deployment costs in comparison to an equivalent wired network due to the savings in cabling, labor, materials, testing and verification. In building automation, for example, the installation cost of a light switch in a building facility can be as high as about 10 to 30 times the cost of the light switch. This estimate does not include the possibility of additional work, such as, for example, conduit installation and infrastructure work.

It is believed that there are two principal unresolved issues in wireless sensor intelligent pairing that challenge those advantages: (1) correctly pairing all of the wireless devices at a large scale facility traditionally takes either relatively long configuration times or, else, requires specialized personnel and equipment; and (2) the effort of adding and configuring additional sensors can be as large as the initial network setup effort.

Hence, such sensor intelligent pairing represents a key barrier for the vision of pervasive wireless sensor networks, due to the need to minimize user intervention during deployment and maintenance. This challenge is further increased when a relatively large population of sensing devices needs to be paired to corresponding controlling devices.

Unlike the cable that connects two devices in a wired network (e.g., a light switch and a lamp), a wireless communication network does not provide a physical indication of which device is to be associated on the other end of the line. This particular piece of information that characterizes the pairing context is the main obstacle for self-configuring pairing in wireless sensor networks. For this reason, most pairing methodologies rely on the use of custom commissioning tools, which require operation by specially trained personnel, in order to provide the missing context. In addition, these methodologies are time-consuming and require their redeployment after any system upgrade. Other methodologies make use of time-based radio frequency (RF) synchronization, which makes the network implementation too expensive, unusable for relatively large-scale deployment (e.g., networks deployed over a large infrastructure), and complicates efforts in realizing automated pairing.

Of all the components that define the context of a wireless sensor application, it is believed that location awareness is the most challenging and is the most important to obtain at the time of performing intelligent pairing.

It is known to employ secondary channels for context sensing in environments where global positioning system (GPS) signals are difficult to obtain (e.g., in indoor environments). One tracking system is based on both ultrasonic and radio signals, aimed at a location granularity of 15 cm. Every 200 ms, a controller sends out a radio message to all transceivers on mobile devices, indicating which transceiver should ping in the next time slot. Meanwhile, the controller also sends a reset message to the receivers' network, requesting them to be ready to pick up the incoming ultrasonic signal. Both location and orientation can be calculated. Unfortunately, this method is based on trilateration, which is an alternative to triangulation that relies upon distance measurements instead of angle measurements, and which requires an existing network infrastructure whose spatial coordinates are known. See Ward, A. et al., "A New Location Technique for the Active Office," IEEE Personal Communications, vol. 4. no. 5, 11 pp. (October 1997); Harter, A. et al., "The Anatomy of a Context-Aware Application," Proceedings of the Fifth Annual ACM/IEEE International Conference on Mobile Computing and Networking, pp. 59-68 (August 1999).

Another location-support system also takes advantage of both ultrasonic and radio signals. Rather than the system tracking the user's location, however, each portable device determines its own location. The mobile device listens to two signals (one RF and one ultrasonic) that simultaneously originate from previously installed transmitters at known points by measuring the distance to a base station calculated by the time interval between the arrivals of two signals. The resulting location accuracy is a few centimeters of accuracy and angles to within 3-5 degrees of the true value. This approach, like the formerly described system, above, requires previous knowledge about the transmitter's spatial coordinates and a good scheduling for the transmitter's "beacons" (RF and ultrasound signals), in order to avoid collisions. See Priyantha, N. B. et al., "The Cricket Location-Support System," Proceedings of the Sixth Annual ACM International Conference on Mobile Computing and Networking, 12 pp. (August 2000).

It is known to combine received signal strength indicator (RSSI) information and acoustic time of flight, in order to estimate distance using simultaneous beaconing. Inexpensive receivers are employed for detecting the beacons and, hence, systematic and calibration errors play a bigger role in affecting the accuracy of the system, which is minimized by a "mean calibration" technique. See Whitehouse, K. et al., "Calibration as Parameter Estimation in Sensor Networks," Proceedings of the First ACM International Workshop on Sensor Networks and Applications, pp. 59-67 (September 2002).

It is known to employ RF and ultrasound in which a personal digital assistant (PDA) with two ultrasound receivers is able to detect a resource (like a printer) in a particular room. The resource emits a synchronized RF and ultrasound beacon upon request from the user via the PDA, and employs trilateration, such that the user is able to determine the location of the resource. It is assumed that the user knows (or has access to) the ID of the resource and manually activates the pairing procedure, which makes it inapplicable for wireless sensor networks. See Kindberg, T. et al., "Validating and Securing Spontaneous Associations between Wireless Devices," Hewlett-Packard Company, pp. i, 1-6 (Sep. 12, 2002).

Another system employs only the RF signal strength of IEEE 802.11 transceivers as an indicator of the distance between a transmitter and a receiver without setting up an additional location tracking system. At the initial (off-line) phase, the system builds an RF signal strength database for a set of fixed receivers associated to known transmitter positions. During the normal operation, the RF signal strength of a transmitter is measured by the set of fixed receivers and is sent to a central computer, which examines the signal strength database and calculates the best fit for the current transmitter position based on a predefined RF propagation model. See Bahl, P. et al., "RADAR: An In-Building RF-based User Location and Tracking System," Proc. IEEE INFOCOM, 10 pp. (March 2000).

There is room for improvement in systems for pairing wireless nodes and in methods for pairing wireless nodes of a communication network.

SUMMARY OF THE INVENTION

These needs and others are met by the present invention, which employs hybrid communication channels (e.g., RF and wireless non-RF based channels). This enables low-cost automated distributed pairing for relatively large wireless sensor networks. For example, the method employs radio frequency signals (e.g., IEEE 802.15.4) and wireless non-radio frequency signals (e.g., light; visible light; infrared; ultrasound) coming from untethered sensors.

In accordance with one aspect of the invention, a method for pairing wireless nodes of a communication network comprises: employing a plurality of network devices; employing a context manager node; for each of the network devices and the context manager node, employing a first communication channel including radio frequency signals and a diverse second communication channel including wireless non-radio frequency signals; at some of the network devices, collecting context information of a corresponding communication environment and transferring the collected context information to the context manager node; and at the context manager node, employing the collected context information and enabling automated distributed pairing of a first node of the network devices with another second node of the network devices.

The method may comprise employing as the collected context information at least one of radio frequency signal attributes of the first communication channel and wireless non-radio frequency signal attributes of the diverse second communication channel.

The method may further comprise selecting the diverse second communication channel in order that presence, absence or degradation of the wireless non-radio frequency signals is affected by the corresponding communication environment to provide the collected context information.

The method may comprise activating a new node; sending a parameter from the new node to the context manager node over the first communication channel in order to request a key; detecting the new node at the some of the network devices and reporting the detected new node to the context manager node by the some of the network devices; determining some of the some of the network devices at the context manager node; instructing the some of the some of the network devices to send the key which is encrypted by the parameter to the new node over the diverse second communication channel; receiving and decrypting the key at the new node; and employing the decrypted key at the new node to join the communication network.

The method may comprise sending a device type from the new node to the context manager node; selecting a plurality of candidate nodes from the network devices at the context manager node; instructing each of the candidate nodes to send location information to the new node over the diverse second communication channel; receiving the location information at the new node from some of the candidate nodes; determining context information of the some of the candidate nodes; reporting the determined context information to the context manager node; determining at least one of the some of the candidate nodes to be paired with the new node at the context manager node; and instructing the at least one of the some of the candidate nodes to be paired with the new node.

The method may further comprise determining signal strength at the new node of the wireless non-radio frequency signals of the diverse second communication channel for the received location information from the some of the candidate nodes; and determining the context information at the new node from the determined signal strength.

As another aspect of the invention, a system for pairing wireless nodes comprises: a plurality of network devices and a context manager node, wherein each of the network devices and the context manager node comprises a first communication channel including radio frequency signals and a diverse second communication channel including wireless non-radio frequency signals, wherein some of the network devices are adapted to collect context information of a corresponding communication environment and to transfer the collected context information to the context manager node, and wherein the context manager node is adapted to employ the collected context information and enable automated distributed pairing of a first node of the network devices with another second node of the network devices.

The network devices may include a plurality of lamp nodes and a plurality of light switch nodes; the system may be a building automation system; and the first node may be one of the light switch nodes which is paired with the other second node, which is one of the lamp nodes.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "wireless" shall expressly include, but not be limited by, radio frequency (RF), light, visible light, infrared, ultrasound, wireless area networks, IEEE 802.11 (e.g., 802.11a; 802.11b; 802.11g), IEEE 802.15

(e.g., 802.15.1; 802.15.3, 802.15.4), other wireless communication standards (e.g., without limitation, ZigBee™ Alliance standard), DECT, PWT, pager, PCS, Wi-Fi, Bluetooth™, and cellular.

As employed herein, the term "communication network" shall expressly include, but not be limited by, any local area network (LAN), wide area network (WAN), low-rate wireless personal area network (LR-WPAN), other types of wireless sensor networks, intranet, extranet, global communication network and/or the Internet.

As employed herein, the term "network coordinator" (NC) shall expressly include, but not be limited by, any communicating device, which operates as the coordinator for devices wanting to join a communication network and/or as a central controller in a wireless communication network, and/or a context manager node.

As employed herein, the term "network device" (ND) shall expressly include, but not be limited by, any communicating device ((e.g., a device node, such as, for example, a control device, an industrial device (e.g., a circuit interrupter or other electrical switching device), a lamp device, a water valve, a camera/sensor device); a sensor node, such as, for example, an industrial sensor (e.g., energy, current, voltage, phase, frequency, power line monitor), a wireless camera, a sensor device, a light switch sensor, a light sensor, a motion sensor, a proximity sensor, a pressure sensor, a barometric sensor, a temperature sensor, a water sensor, a vibration sensor, a physical property sensor, a sensor of a wirelessly enabled sensor network; a device/sensor node; a display node), which participates in a wireless communication network, and which is not a network coordinator.

As employed herein, the term "node" includes NDs and NCs.

As employed herein, the term "server" shall expressly include, but not be limited by, a base station; a context manager and/or a network coordinator.

As employed herein, the term "context" means any information that can be used in an application of interest to characterize the situation of places and physical objects.

As employed herein, the term "context-awareness" means the use of context to provide task-relevant information and/or services to a user, in order to modify its behavior, accordingly, without requiring explicit human intervention. For example, automatic execution of node pairing is such a desired behavior. As another example, a context manager is the software agent responsible for keeping up-to-date all relevant context information and, also, providing a context-awareness decision engine.

As employed herein, the term "context manager node" shall expressly include, but not be limited by, a context manager software agent, a base station, a server and/or a network coordinator that pairs nodes, such as network devices, grants access to a communication network, and determines suitable or best candidate nodes for pairing. For example, the context manager node may keep track of current context (e.g., without limitation, changes in RF patterns; new nodes added to the communication network) and may estimate the state of the application.

The present invention is described in association with a building-automation system, although the invention is applicable to a wide range of systems and methods for pairing wireless nodes of a communication network.

The disclosed system and method employ hybrid (e.g., diverse) communication channels to enable low-cost automated distributed pairing for relatively large wireless sensor networks. The method employs radio frequency (RF) signals (e.g., without limitation, IEEE 802.15.4) and wireless non-RF signals (e.g., without limitation, light; visible light; infrared; ultrasound; sound; other suitable wireless non-RF signals) coming from, for example, untethered sensors in order to provide to a context-aware sensor, all the information needed for performing an intelligent pairing.

An important aspect of the invention, as applied, for example, to building automation applications, is taking advantage of the limited range of some non-RF based wireless channels (e.g., secondary channels) participating in a communication network. The secondary channel is preferably chosen in such a way that its presence, absence or degradation, as affected by the corresponding communication environment, implicitly provides context information. From this point, inference rules are built and applied to the nodes to be paired, thereby enabling automatic distributed pairing. For example, walls surrounding a lighting fixture certainly limit the coverage of any data transmitted when using light as a carrier. This reduces the possibility of having a context misinterpretation.

All of this information is processed at a context manager, which is capable of inferring how the pairing is done. As an example, this function may be embedded in the gateway node of a typical aggregation-type wireless sensor network or, for the specific example of IEEE 802.15.4, in the PAN coordinator thereof.

Some of the systems discussed, above, in connection with the Background Information, are based on the principle of trilateration. However, in a facilities management domain (e.g., building automation), the accuracy of a node's location does not need to be high. Instead, the accuracy just needs to be enough in order that the context manager can make the appropriate pairing assignments for that node. Consequently, the nodes disclosed herein collect suitable context information of the relevant communication environment at a suitable update frequency and transfer it to the context manager. This information contains a sample of the RF and/or diverse secondary channel signal attributes, linked with the node's neighbor, whose ID information is carried in both media. When a new node is replaced or added, it also collects the context information in an initial phase, and the context manager may determine "where" the node is and "who" is its mate, if applicable. The payload size of such information context can be made small enough, in order that the corresponding bandwidth is minimal, thereby making the context retrieval feasible even in relatively low-rate environments like, for example, a low rate-wireless personal area network (LR-WPAN) wireless communication network.

Figure 1:
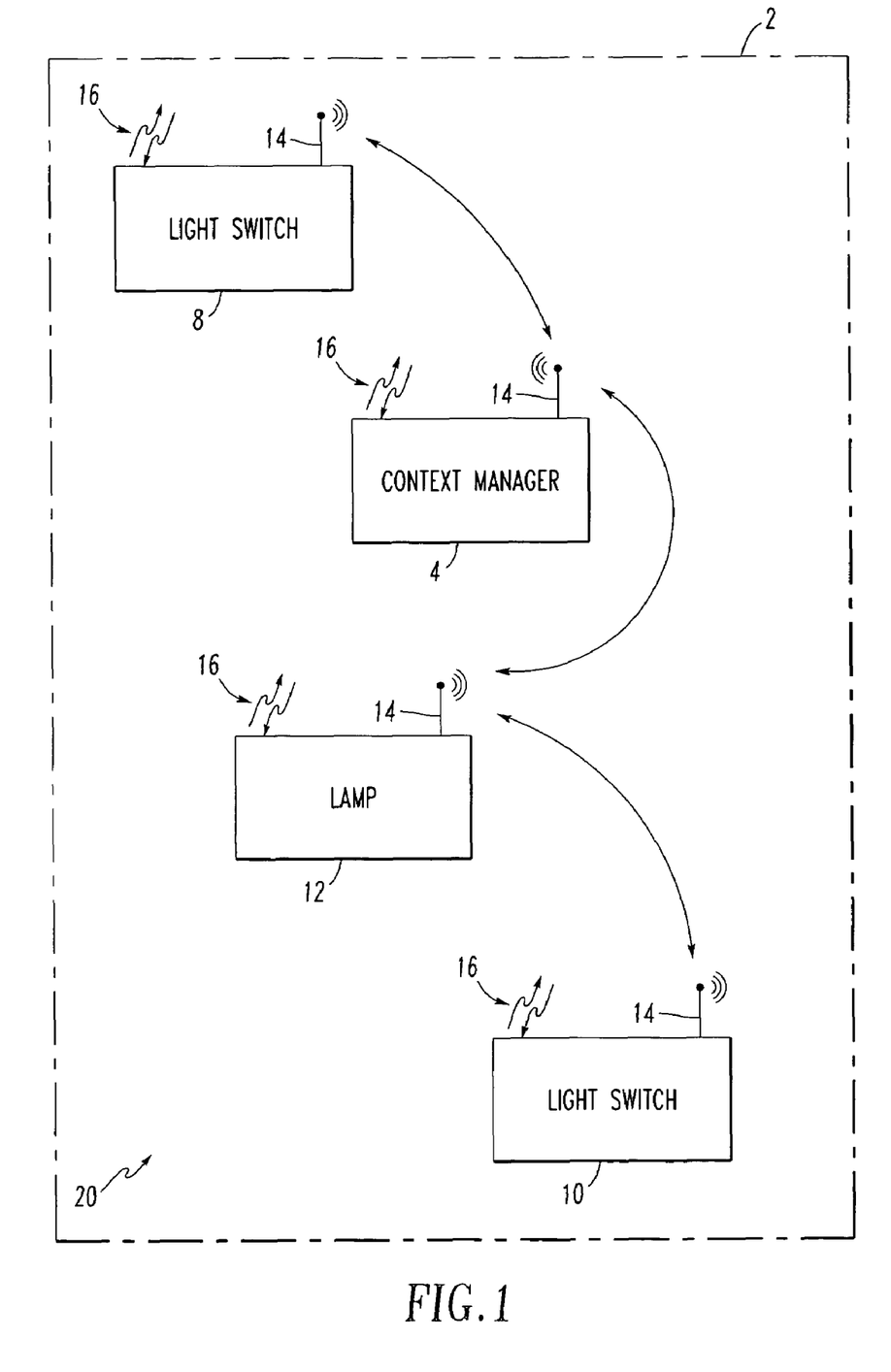
FIG. 1 is a block diagram of a wireless system in accordance with the present invention.

FIG. 1 is a block diagram of a wireless communication system, such as a wireless lighting control system 2. The system 2 includes a context manager 4, a plurality of sensors, such as light switches 8,10, and one or more output devices, such as a lamp 12 (only one output device 12 is shown in FIG. 1). The sensors 8,10, device 12 and context manager 4 all employ RF communications 14. The sensors 8,10, device 12 and context manager 4 also employ wireless non-RF communications 16 (e.g., without limitation, visible light). These nodes 4,8,10,12 form a wireless network 20 in which the node ID for each of such nodes is unique and preferably is stored in a suitable non-volatile memory, such as EEPROM 40 (FIG. 2) or 100 (FIGS. 3 and 4), on each such node.

As shown with the device 12, the network 20 preferably employs an adhoc, multihop capability, in which the sensors 8,10 and the device 12 do not have to be within RF range of the context manager 4, in order to communicate.

Figure 2:
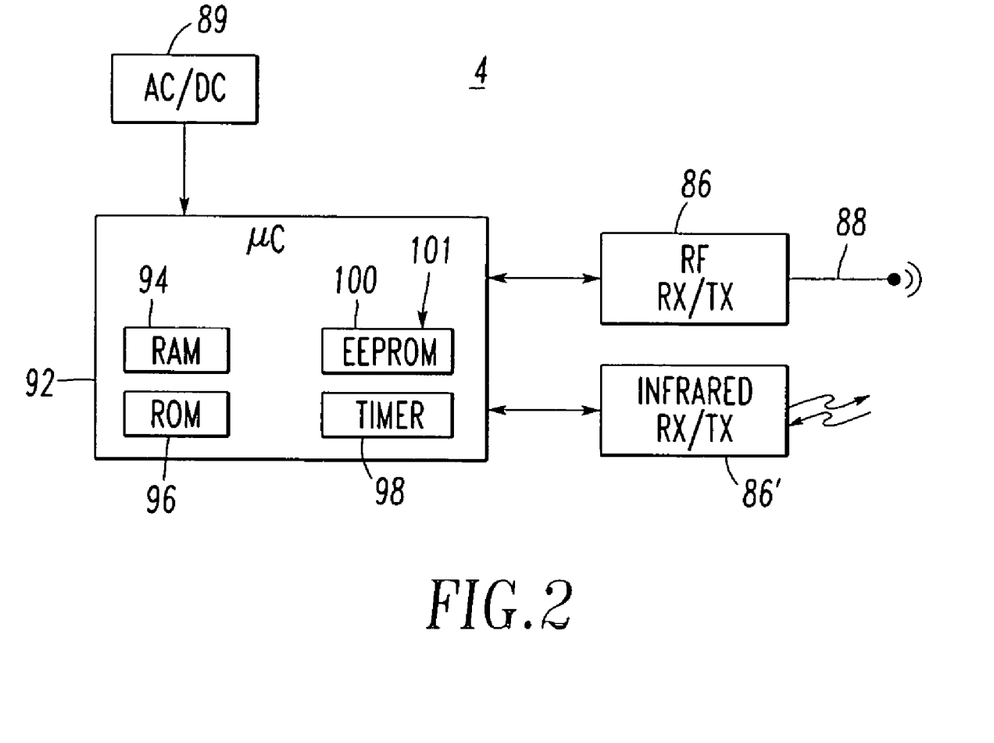
FIG. 2 is a block diagram of the context manager of FIG. 1.

FIG. 2 shows the context manager 4 of FIG. 1. The context manager 4 includes an RF transceiver (RF RX/TX) 86 having an antenna 88, a suitable processor, such as a microcontroller (μC) 92 having RAM 94, ROM 96, a timer 98 and other memory (e.g., EEPROM 100 including the unique ID 101 of the node which is stored therein during manufacturing). The context manager 4 also includes a wireless non-RF (e.g., without limitation, secondary channel; visible light) transceiver (RX/TX) 86'. The context manager 4 is powered from a suitable AC/DC power source 89.

The μC 92 may be an Atmel ATmega128L marketed by Atmel Corporation of San Jose, Calif. The μC 92 and the transceivers 86,86' may communicate through suitable serial interfaces (e.g., SCI; SPI). The context manager memory, such as EEPROM 100, may store other nonvolatile information such as, for example, the unique IDs of other nodes, which are part of the wireless network 20, and other configuration related information. The transceiver 86 may be, for example, a CC2420 radio processor marketed by Chipcon AS of Oslo, Norway. The transceiver 86 may incorporate a suitable microcontroller core, a relatively very low-power RF transceiver, and a suitable hardware IEEE 802.15.4 compliant encryption mechanism. The transceiver 86' may be similar to the transceiver 86, except that it employs a different physical interface.

Figure 3:
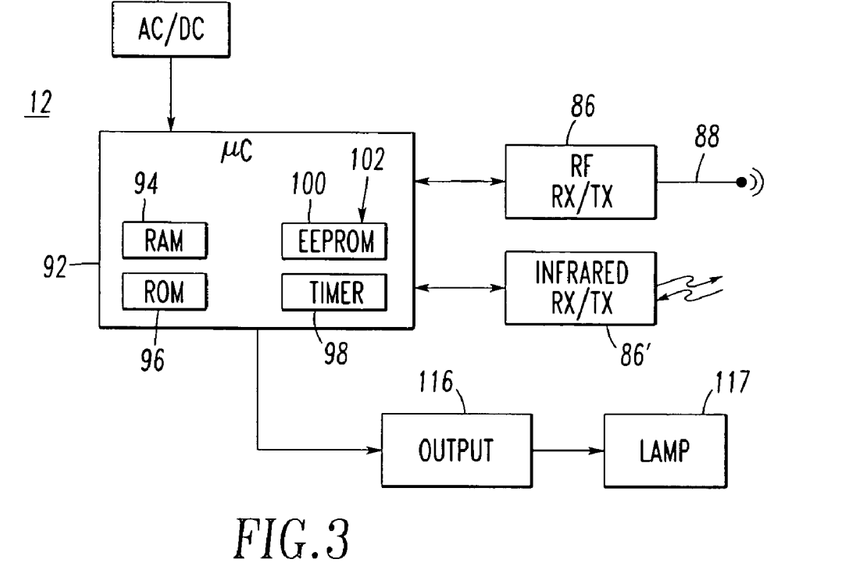
FIG. 3 is a block diagram of one of the lamp nodes of FIG. 1.
Figure 4:
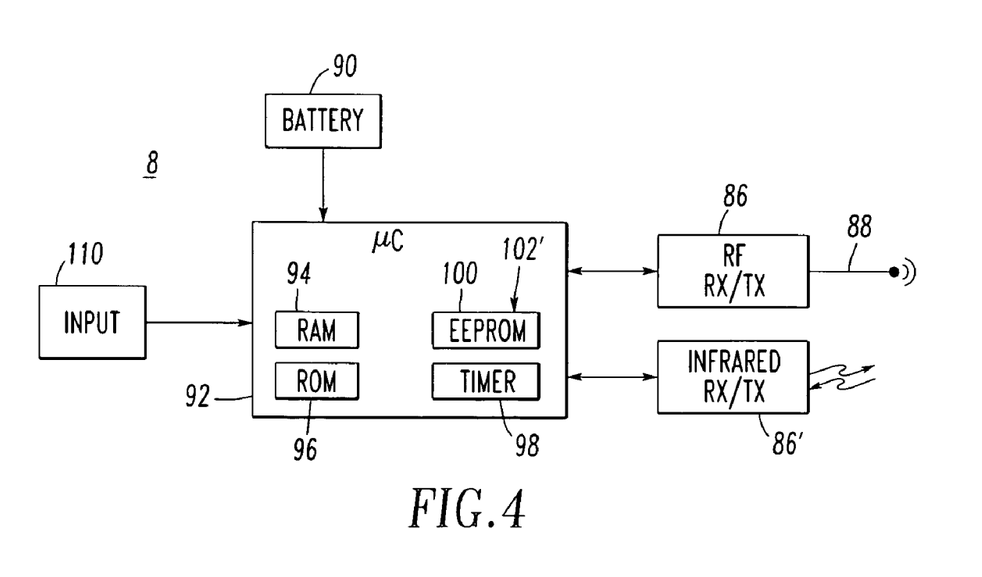
FIG. 4 is a block diagram of one of the light switch nodes of FIG. 1.

FIGS. 3 and 4 are block diagrams of the lamp device 12 and the light switch sensor 8, respectively, of FIG. 1. Each of the device 12 and the sensor 8 includes an RF transceiver (RF RX/TX) 86 having an antenna 88, a suitable processor, such as a microcontroller (μC) 92 having RAM 94, ROM 96, a timer 98 and other memory (e.g., EEPROM 100 including the unique ID 102,102' of the node which is stored therein during manufacturing). Each of the device 12 and the sensor 8 also includes a wireless non-RF (e.g., without limitation, a suitable secondary, channel; visible light) transceiver (RX/TX) 86'.

The device 12 is powered from a suitable AC/DC power source 89. The device 12 includes a suitable control output 116 (e.g., adapted to turn on or off a lamp 117). The sensor 8 includes a battery 90 for powering the various sensor components and a physical input interface 110 for the light switch control function.

The device 12 (FIG. 3) and the sensor 8 (FIG. 4) do not include an indicator. It will be appreciated, however, that one or both of such device and sensor may employ an indicator (e.g., to show that a battery 90 is OK; to show an on/off input or output state).

Figure 5A:
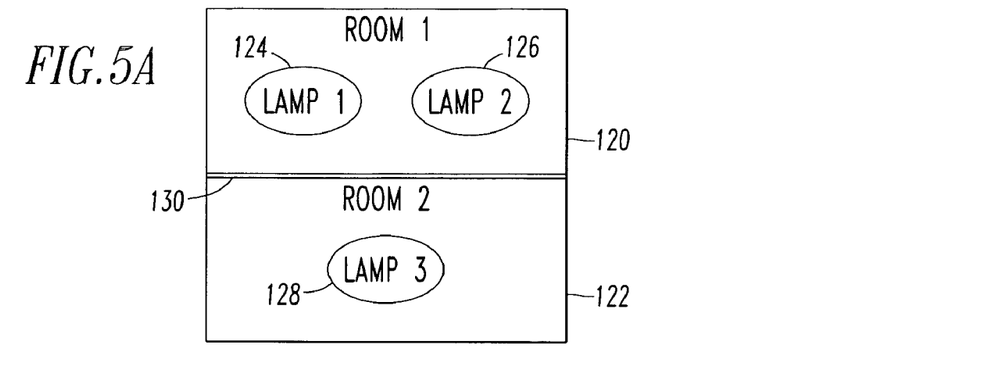
FIG. 5A is a block diagram of two rooms including various lamps.
Figure 5B:
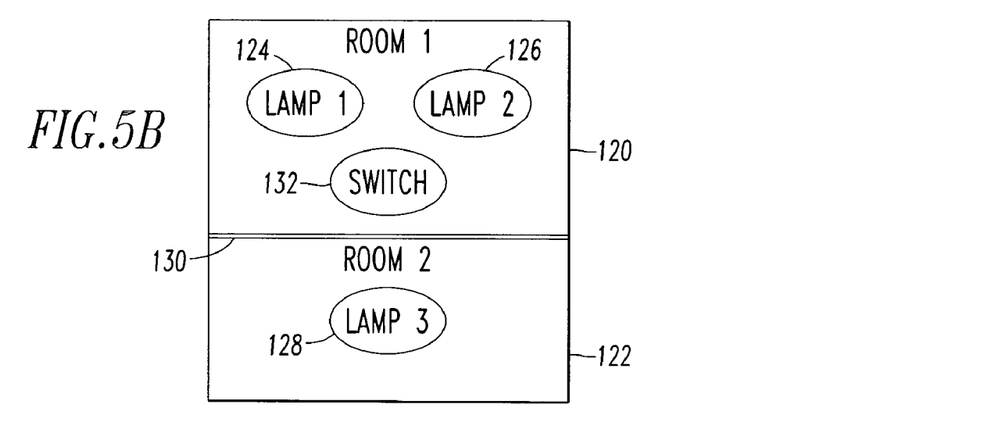
FIGS. 5B-5C are block diagrams of two rooms including various lamps and a light switch.

Referring to FIG. 5A, for the purpose of illustrating a self-configuring pairing procedure, the example wireless lighting control system 2 of FIG. 1 services two rooms 120, 122. Two lamps 124,126 are installed at the first room 120, while a third lamp 128 covers the second room 122. Here, it is assumed that the walls, such as 130, dividing the rooms 120,122 do not allow light (e.g., visible light in this example) to go through them. As shown in FIG. 5B, there is also a light switch 132 in the first room 120. Like the device 12 of FIG. 3, all of the lamps 124,126,128 include a wireless node capable of receiving and transmitting both RF and non-RF (e.g., visible light) wireless signals. Like the sensor 8 of FIG. 4, the light switch 132 includes a wireless node capable of receiving and transmitting RF and non-RF (e.g., visible light) wireless signals.

Figure 5C:
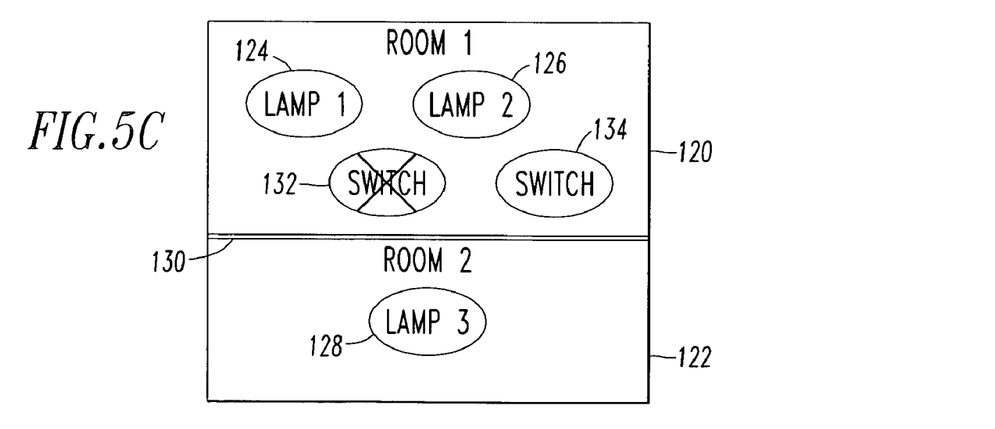

FIGS. 5B and 5C cover two different scenarios: (1) the addition of a new node, such as the light switch 132, into the system 2 of FIG. 1 (first time pairing) (FIG. 5B); and (2) the replacement of an existing node, such as the light switch 132 of FIG. 5B, with a replacement node, such as light switch 134, with automatic re-pairing (FIG. 5C). Both of these procedures conform to self-configuring pairing.

Figure 6A:
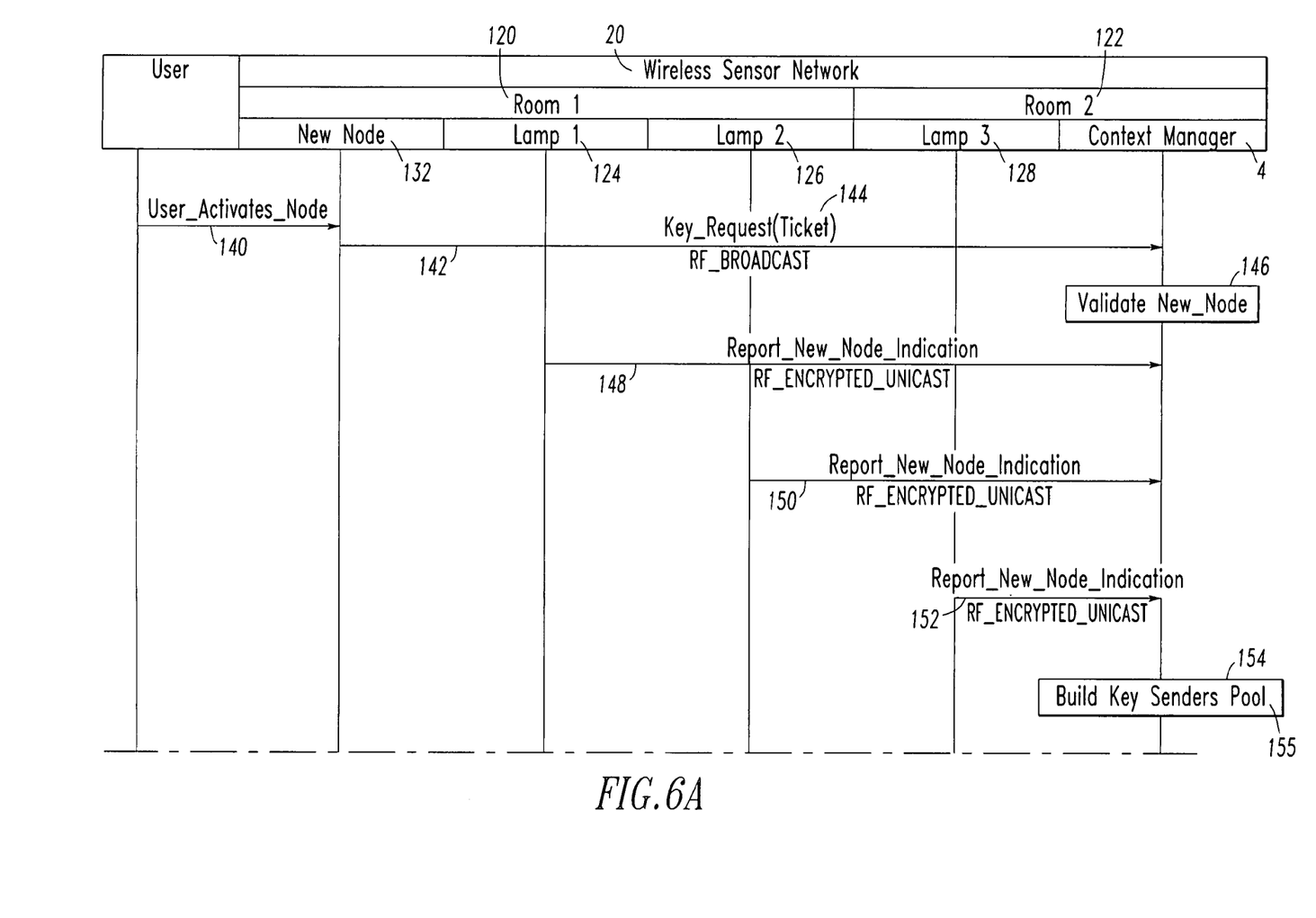
FIGS. 6A-6B, 7A-7B and 8A-8B are message flow diagrams for wireless messages employed by the nodes and the context manager of FIG. 1.
Figure 6B:
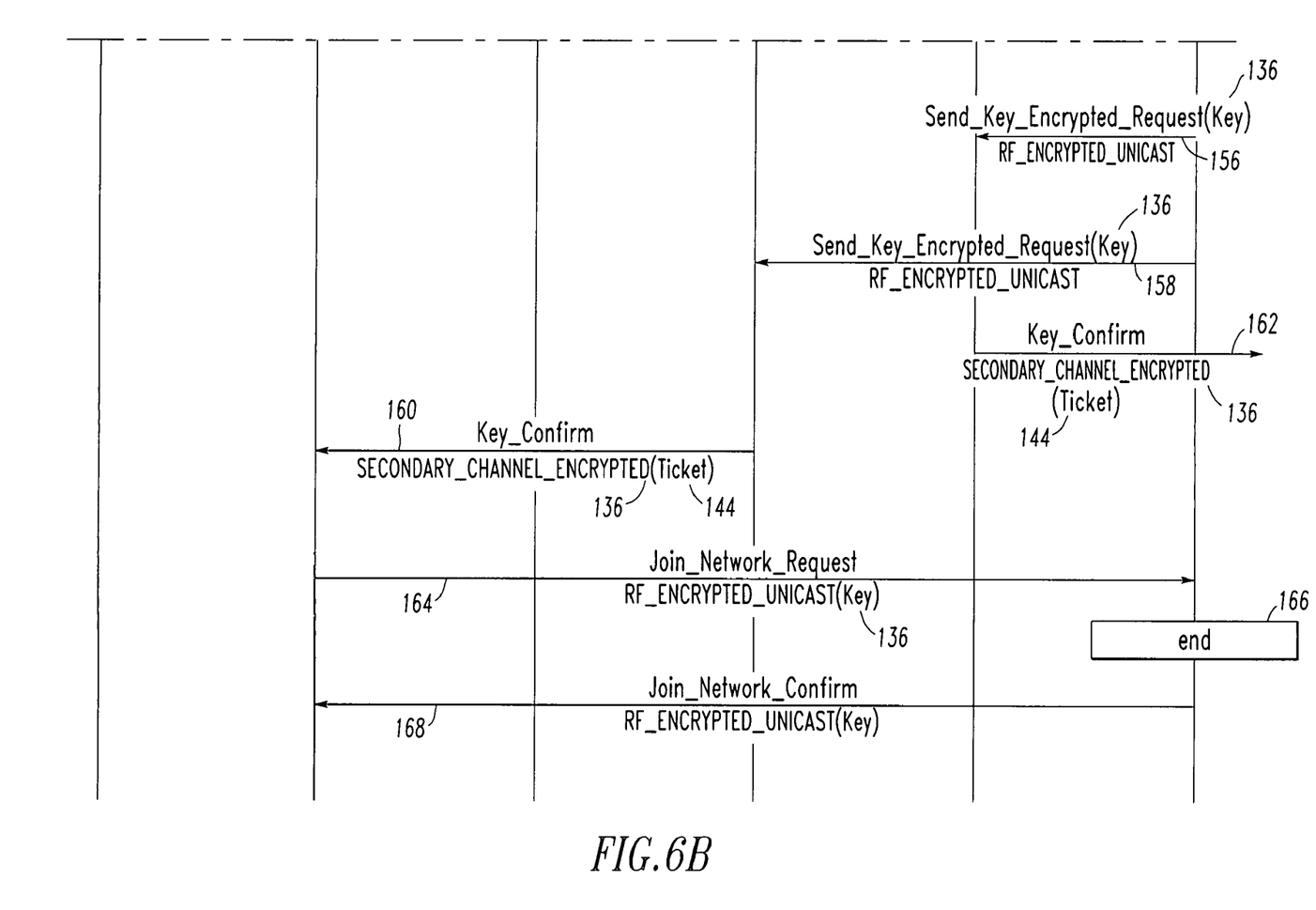

With reference to FIG. 5B, for the first time pairing procedure, the user of the lighting system 2 (FIG. 1) wants to add the new wireless light switch node 132 to control the lamps 124,126 in the first room 120 (FIG. 5B). In order to achieve this goal, the new node 132 is authenticated and, then, the actual pairing procedure is conducted by the context manager 4 (FIG. 1). In the authentication phase, the new node 132 obtains information about the location and a key 136 (FIG. 6B) as supplied by the secondary (e.g., visible light) channel in order to gain access to the main RF channel of the communication network 20 (FIG. 1). The message flow diagram of FIGS. 6A-6B illustrates the corresponding message flow.

First, after a user activates the new node 132 (e.g., turns the node on), at 140, the node 132 tries to obtain information about its communication environment. At 142, the new node 132 requests the key 136 (FIG. 6B) for accessing the sensor network 20 from the context manager 4 by an RF broadcast, as shown, or by a series of multi-hop unicasts (not shown). As a parameter, a ticket 144 (e.g., uniquely identified and specially created to validate the transaction) is sent by the new node 142. This ticket 144 will be used, later, to encrypt the system's key 136. At 146, the context manager 4 may perform an initial validation (e.g., that varies depending upon the specific security requirements of the application) and then decide to grant access to the new node 132. At 148,150,152, all of the nearby nodes (e.g., 124,126,128) report detection (e.g., by receipt of the RF broadcast at 142) of the new node 132 to the context manager 4. As shown, the messages from the nearby nodes, at 148,150,152, are RF encrypted unicast messages in which the corresponding key (not shown) is known by the context manager 4 or which is unique to each of the pairs of the context manager 4 and the nodes 124,126,128.

With this information, at 154, the context manager 4 determines which of the neighbors (e.g., the nodes 124,126,128 in this example) can reach the new node 132 using the secondary (e.g., visible light) channel, and selects the most appropriate trusted node(s) (e.g., which is (are) known to be within RF range in order to minimize flooding) to send the key information by that secondary channel. Those nodes are stored in the senders pool 155. The context manager 4 instructs, at 156,158 (FIG. 6B), each of the nodes (e.g., the nodes 126,128 in this example) in the senders pool 155 to send the key 136 to the new node 132 using the secondary channel with the key 136 being encrypted with the new node's ticket 144 for added security. In this example, the context manager 4 decides, for example, to not include the first lamp 124 (Lamp 1) as part of the senders pool 155. The nodes 126,128 send over the secondary channel respective messages 160,162 including the key 136, which is encrypted with the ticket 144.

If the new node 132 is located in a valid place (e.g., room 120 in this example), then it will receive the access key 136, as encrypted by the ticket 144 that was originally sent, at 142, by the new node 132. Here, the message 162 is lost, since it was sent from the second room 122, while the message 160 from the first room 120 is received. In this manner, spoofing is minimized, since the access is enforced by location. With this information, the new node 132 can join the network 20 using the secret key 136. After the Join Network Request message 164 arrives from the new node 132, the key sending procedure of the context manager 4 stops at 166. When the confirmation message 168 from the context manager 4 arrives at the new node 132, the authentication procedure is successfully completed.

Figure 7A:
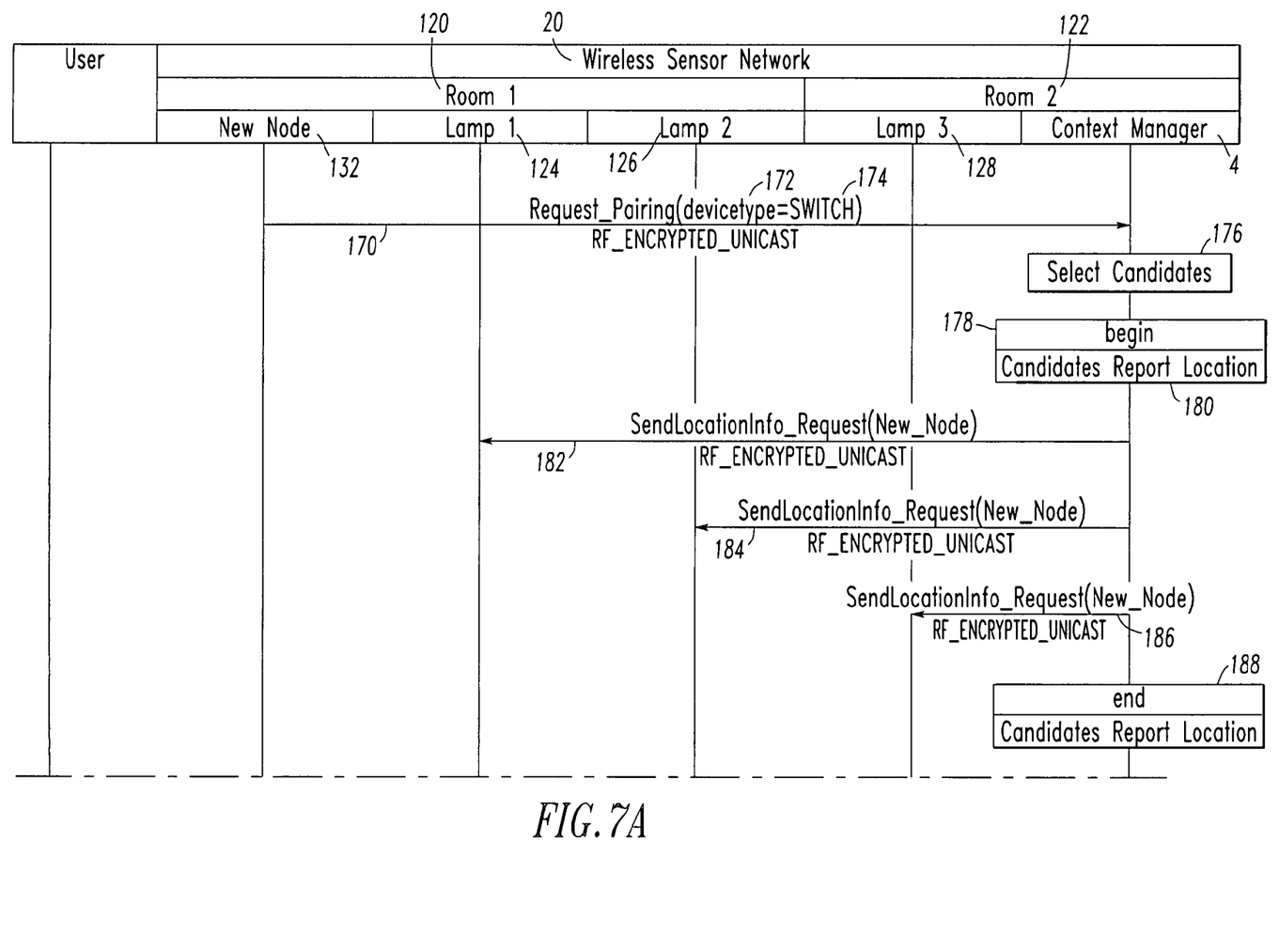
Figure 7B:
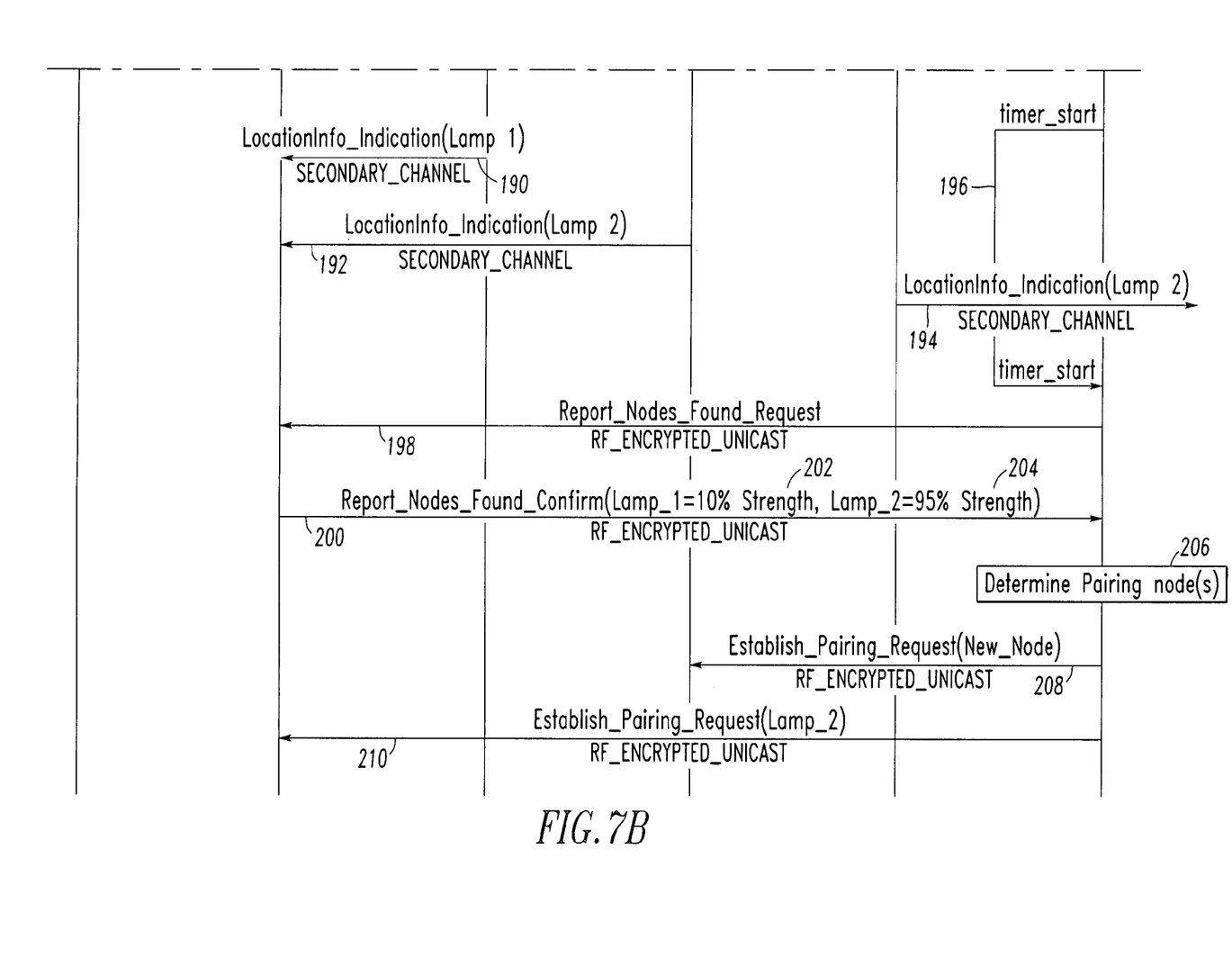

FIGS. 7A-7B illustrate the pairing phase during which the location information, in combination with existing knowledge at the context manager 4 (e.g., validation system), determines who is (are) the partner node(s) to be paired with the new node 132. After the new node 132 joins the system 2 (FIG. 1), at 164,168 of FIG. 6B, a procedure (FIGS. 7A-7B) to determine the best mate(s) for the new node 132 is started. First, at 170, the new node 132 requests to be paired by sending to the context manager 4 all relevant information (e.g., its device type 172) needed in order to make an intelligent pairing decision. In this example, the device type 172 indicates that the new node 132 is a light switch 174. With this information, the context manager 4, at 176, selects the possible candidate(s) and builds, at 178, a list 180 of all such candidate(s) by matching the initial criteria given by the context (e.g., location and ID of any former nodes (not shown)) and any previously established knowledge and the addition of the new node 132. In this example, it is known that only lamps, such as 124,126,128, can be paired with light switches, such as 132. Next, at 182,184,186, the context manager 4 instructs each node (e.g., lamps 124,126,128 in this example) in the candidate list 180 to send their location information to the new node 132 through the secondary (e.g., visible light) channel. The context manager 4 reaches the end of the candidate list 180 at 188. As will be explained, the new node 132 will receive location information from the nodes 124,126,128 and also collect other parameters (e.g., a "signature" or context information) that will be useful to the context manager 4 in order to establish a correct pairing. For example, at 190,192,194, the respective nodes 124,126,128 send their location information. In this example, only the visible light signals that reach the new node 132 (e.g., due to the location restrictions of the two rooms 120,122 of FIG. 5B) are registered, along with the context information (e.g., received visible light signal strength in this example). Here, since the lamp 128 (Lamp 3) is in another room 122, the location information gets lost and is not received by the new node 132.

After 188, at 196, the context manager 4 starts its timer 25 (FIG. 2). The timer duration is selected to provide sufficient time for the nodes 124,126,128 to send their location information. After the timer 25 expires, at 198, the context manager 4 requests that the new node 132 report the context information of any of the nodes 124,126,128. Then, at 200, the new node 132 reports its findings (i.e., the context information) back to the context manager 4 in order to determine the location of the new node 132. For example, the new node 132 reports that the nodes 124,126 from the first room 120 were found and that the visible light signal strength 202 of the first node 124 is, for example, 10%, while the visible light signal strength 204 of the second node 126 is, for example, 95%.

The signal strengths 202,204 may be determined, for example, by a suitable received signal strength indicator that measures the amount of energy in the radio frequency environment. This energy may belong to devices from the same "class" or from interference. Alternatively, a correlation code strength indicator measures the similarity of the waveform of the radio frequency signals by correlating such waveform with a known pattern (e.g., a template). Modern digital communication systems employ conventional spread spectrum technology to provide a robust communication channel used in a wide array of applications. A spread spectrum system modulates the data (message) with a pseudo-random noise code, which has a significantly higher data rate than the data message itself. The effect is that the outgoing signal is spread over a much wider frequency band than the original message would have occupied. For example, a conventional spread spectrum receiver demodulates the spread spectrum signal to recover the original data from the pseudo-random noise.

Next, at 206, the context manager 4 executes a suitable matching algorithm with the additional information obtained in order to determine the node(s) to be paired from the candidate list 180. Here, for example, the matching algorithm employs the largest visible light signal strength as the matching criteria, which, in this example, selects the second node 126 based upon the 95% visible light signal strength for that node. It will be appreciated, however, that other suitable matching criteria (e.g., without limitation, RF signal strength; RF and visible light signal strengths) may be employed. Finally, at 208, the context manager 4 instructs the appropriate node(s), which in this example is the single node 126, to be paired to the new node 132, which receives a corresponding instruction at 210.

Figure 8A:
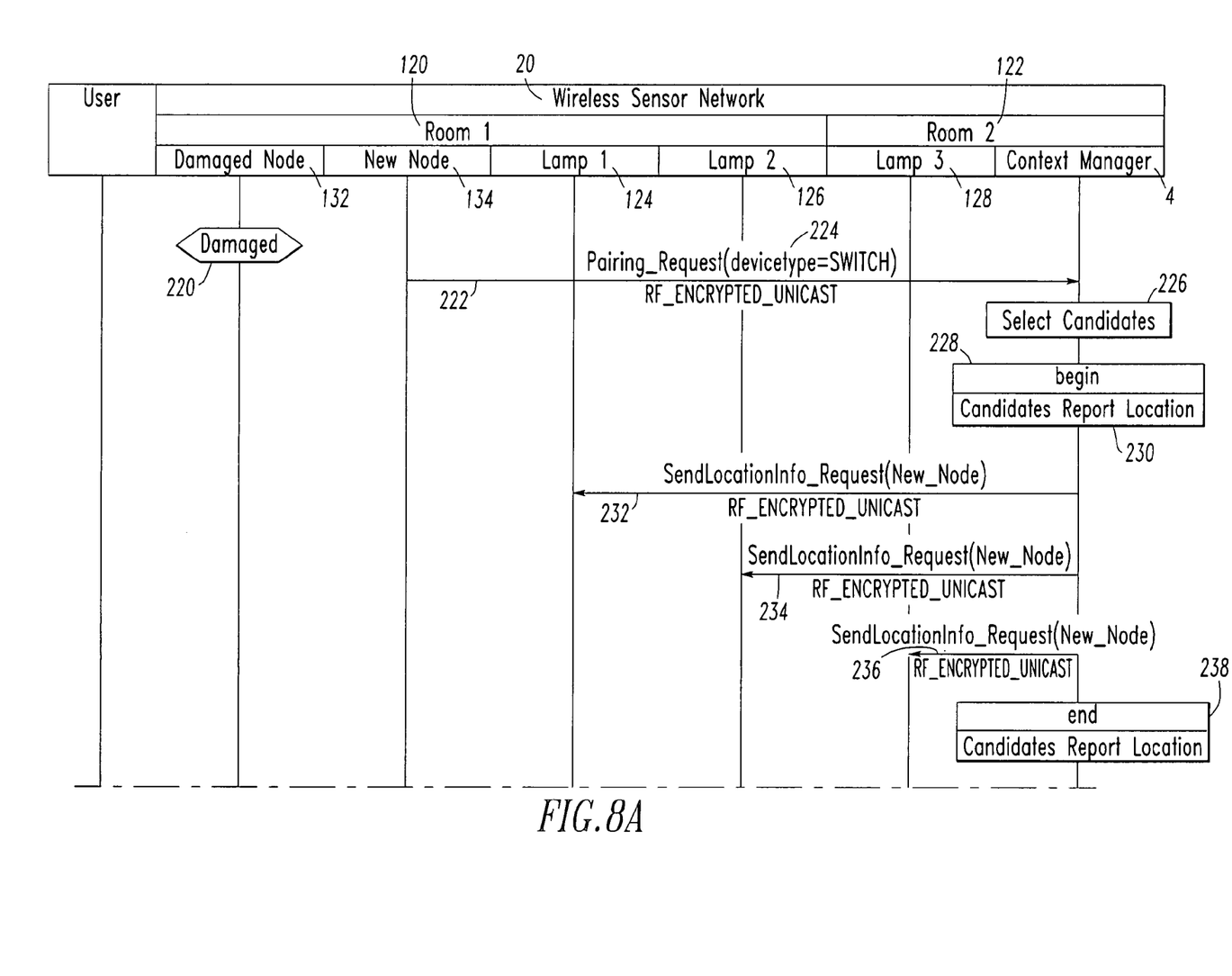
Figure 8B:
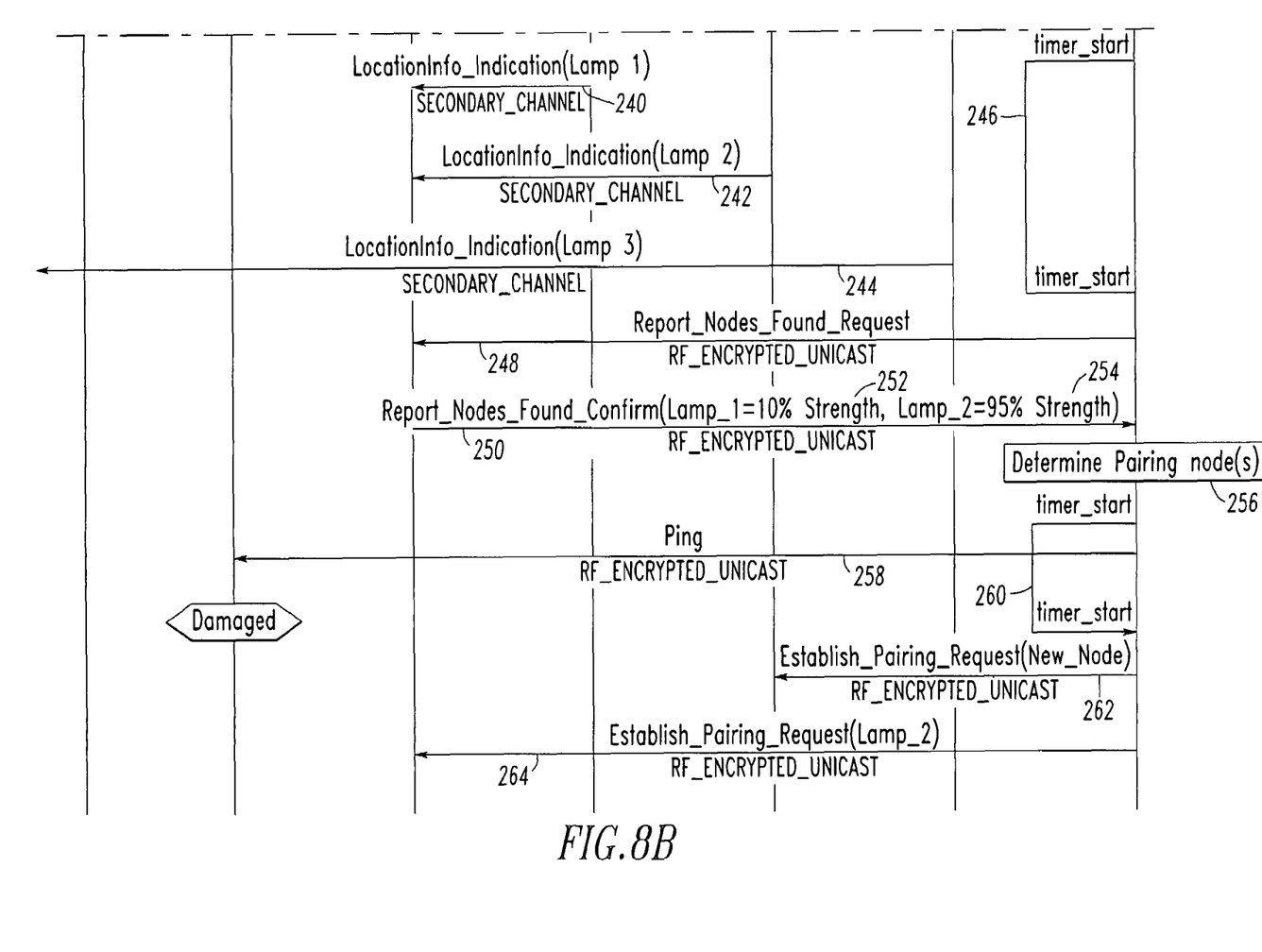

Referring to FIGS. 5C and 8A-8B, the replacement pairing procedure is disclosed. For example, if the previously installed light switch 132 becomes damaged, at 220 (e.g., is now a "broken" node), or if it otherwise needs replacement, then this causes the user of the lighting system 2 (FIG. 1) to install a new wireless light switch 134 that will replace the old light switch 132 as is shown in FIG. 5C. Similar to the case of a first time node (132 of FIG. 5B), the replacement node 134 must first be authenticated, in order that the actual pairing procedure can start.

The authentication phase is performed in the same manner as the first time pairing procedure, as was disclosed, above, in connection with FIGS. 6A-6B. In the pairing phase, the location information in combination with the existing knowledge at the context manager 4 (validation system) determines who is (are) the partner node(s) to be paired with the replacement node 134. After the node 134 joins the system 2, a procedure to determine the best mate(s) for the replacement node 134 is started. In the particular case of replacement pairing, the context manager 4 can do further processing in order to determine which node (e.g., node 132 in this example) has been replaced.

As shown in FIGS. 8A-8B, the light switch node 132 is damaged. It is assumed that the user places the replacement node 134 in the same or a similar location as the previous node 132. Next, at 222, the replacement node 134 requesting to be paired sends to the context manager 4 all relevant information (e.g., its device type 224) needed in order to make an intelligent pairing decision. With this information, at 226, the context manager 4 selects the possible candidate(s) and builds, at 228, a list 230 of all candidate(s) by matching the initial criteria given by the context (e.g., location and ID of the node 132) and previously established knowledge and the addition of the replacement node 134. In this example, it is known that only lamps, such as 124,126,128, can be paired with light switches, such as 132,134.

Next, at 232,234,236, the context manager 4 instructs each node in the candidate list 230 to send their location information to the replacement node 134 through the secondary (e.g., visible light) channel. At 238, the context manager 4 reaches the end of the candidate list 230. Then, at 240,242,244, the respective nodes 124,126,128 send their location information. Only the visible light signals that reach the replacement node 134 (e.g., due to the location restrictions of the first room 120) are registered, along with other parameters (the "signature" or context information) (e.g., visible light signal strength in the example) that will be useful to the context manager 4 in order to establish a correct pairing. Here, since the lamp node 128 (Lamp 3) is in another room 122, the location information gets lost and is not received by the replacement node 134.

After 238, at 246, the context manager 4 starts its timer 25 (FIG. 2). The timer duration is selected to provide sufficient time for the nodes 124,126,128 to send their location information. After the timer 25 expires, at 248, the context manager 4 requests that the replacement node 134 report the context information of any of the nodes 124,126,128. Then, at 250, the replacement node 134 reports its findings (i.e., the context information) back to the context manager 4 in order to determine the location of the replacement node 134. For example, the replacement node 134 reports that the nodes 124,126 from the first room 120 were found and that the visible light signal strength 252 of the first node 124 is, for example, 10%, while the visible light signal strength 254 of the second node 126 is, for example, 95%.

Next, at 256, the context manager 4 executes a suitable matching algorithm with the additional information obtained in order to determine the node(s) to be paired from the candidate list 230. Here, for example, the matching algorithm employs the largest visible light signal strength as the matching criteria, which, in this example, selects the second node 126 based upon the 95% visible light signal strength for that node. It will be appreciated, however, that other suitable matching criteria (e.g., without limitation, RF signal strength; RF and visible light signal strengths) may be employed. Here, the context manager 4 determines that there is a node 132 with similar context information (i.e., the damaged node 132).

If, as shown in this example, the results from the matching algorithm 256 coincide with a node contact similar to the replacement node 134, then the context manager 4 may verify if a replacement is taking place. For example, the context manager 4 ensures that there is no conflict of nodes by verifying, at 258, if the old node 132 is not in or responsive to the system 2 (FIG. 1) anymore. After a timeout, at 260, the context manager 4 assumes that the replacement node 134 is replacing the old node 132. Finally, at 262, the context manager 4 instructs the appropriate node(s), which in this example is the single node 126, to be paired to the replacement node 134, which receives a corresponding instruction at 264.

The disclosed self-configuring pairing methodology is based on context retrieval and represents an improvement over the known prior art by responding directly to many applications requiring rapid, straightforward and inexpensive node configuration and installation. Due to its simplicity, the disclosed method is suitable for wireless sensor networks, such as, for example, those using LR-WPAN technology. This hybrid communication methodology can have immediate benefits in relatively large sensor applications, such as, for example, building automation, while still maintaining the low-cost approach required for direct applicability in the field.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method for pairing wireless nodes of a communication network, said method comprising:
    employing a plurality of network devices;
    employing a context manager node;
    for each of said network devices and said context manager node, employing a first communication channel including radio frequency signals and a diverse second communication channel including wireless non-radio frequency signals;
    at some of said network devices, collecting context information of a corresponding communication environment and transferring said collected context information to said context manager node;
    at said context manager node, employing said collected context information and enabling automated distributed pairing of a first node of said network devices with another second node of said network devices;
    adding said first node as a new node of said network devices;
    authenticating said new node by said context manager node before pairing said new node with said another second node;
    activating said new node;
    sending a parameter from said new node to said context manager node over said first communication channel in order to request a key;
    detecting said new node at said some of said network devices and reporting the detected new node to said context manager node by said some of said network devices;
    determining some of said some of said network devices at said context manager node;
    instructing said some of said some of said network devices to send the key which is encrypted by said parameter to said new node over said diverse second communication channel;
    receiving and decrypting the key at said new node; and
    employing said decrypted key at said new node to join said communication network.

2. The method of claim 1 further comprising
    employing as said parameter a uniquely identified ticket to validate said receiving and decrypting the key at said new node.

3. The method of claim 1 further comprising
    employing one of a radio frequency broadcast or a series of multi-hop radio frequency unicasts to send said parameter from said new node.

4. A method for pairing wireless nodes of a communication network, said method comprising:
    employing a plurality of network devices;
    employing a context manager node;
    for each of said network devices and said context manager node, employing a first communication channel including radio frequency signals and a diverse second communication channel including wireless non-radio frequency signals;
    at some of said network devices, collecting context information of a corresponding communication environment and transferring said collected context information to said context manager node;
    at said context manager node, employing said collected context information and enabling automated distributed pairing of a first node of said network devices with another second node of said network devices;
    adding said first node as a new node of said network devices;
    authenticating said new node by said context manager node before pairing said new node with said another second node;
    sending a device type from said new node to said context manager node;
    selecting a plurality of candidate nodes from said network devices at said context manager node;
    instructing each of the candidate nodes to send location information to said new node over said diverse second communication channel;

receiving said location information at said new node from some of said candidate nodes;

determining context information of said some of said candidate nodes;

reporting said determined context information to said context manager node;

determining at least one of said some of said candidate nodes to be paired with said new node at said context manager node; and instructing said at least one of said some of said candidate nodes to be paired with said new node.

5. The method of claim 4 further comprising determining signal strength at said new node of the wireless non-radio frequency signals of said diverse second communication channel for said received location information from said some of said candidate nodes; and determining said context information at said new node from said determined signal strength.

6. A method for pairing wireless nodes of a communication network, said method comprising:

employing a plurality of network devices;

employing a context manager node;

for each of said network devices and said context manager node, employing a first communication channel including radio frequency signals and a diverse second communication channel including wireless non-radio frequency signals;

at some of said network devices, collecting context information of a corresponding communication environment and transferring said collected context information to said context manager node;

at said context manager node, employing said collected context information and enabling automated distributed pairing of a first node of said network devices with another second node of said network devices;

replacing an old node of said network devices with a replacement node;

authenticating said replacement node before pairing said replacement node with another node of said network devices;

sending a device type from said replacement node to said context manager node;

selecting a plurality of candidate nodes from said network devices at said context manager node;

instructing each of the candidate nodes to send location information to said replacement node over said diverse second communication channel;

receiving said location information at said replacement node from some of said candidate nodes;

determining context information of said some of said candidate nodes;

reporting said determined context information to said context manager node;

determining at least one of said some of said candidate nodes to be paired with said replacement node at said context manager node; and instructing said at least one of said some of said candidate nodes to be paired with said replacement node.

7. The method of claim 6 further comprising employing said old node at a first location; and placing the replacement node at a second location which is the same as or similar to the first location.

8. The method of claim 7 further comprising verifying if a replacement of said old node is taking place before instructing said at least one of said some of said candidate nodes to be paired with said replacement node.

* * * * *